United States Patent
Li et al.

(10) Patent No.: US 7,430,951 B1
(45) Date of Patent: Oct. 7, 2008

(54) METHOD AND APPARATUS FOR TRIMMING ALUMINUM SHEET TO REDUCE SLIVERS AND IMPROVE EDGE QUALITY

(75) Inventors: Ming Li, Murrysville, PA (US); Gregory Fata, Westland, MI (US)

(73) Assignee: Alcoa Inc., Pittsburgh, PA (US)

( * ) Notice: Subject to any disclaimer, the term of this patent is extended or adjusted under 35 U.S.C. 154(b) by 401 days.

(21) Appl. No.: 09/645,653

(22) Filed: Aug. 24, 2000

(51) Int. Cl.
*B26D 1/08* (2006.01)
(52) U.S. Cl. ............................ 83/684; 83/693; 83/694
(58) Field of Classification Search ............... 83/694, 83/653, 128, 686, 698.31, 693, 684, 636, 83/689; 428/577, 599, 596, 606
See application file for complete search history.

(56) References Cited

U.S. PATENT DOCUMENTS

| | | | |
|---|---|---|---|
| 2,207,872 A | 7/1940 | Östberg | |
| 2,339,641 A | 1/1944 | Jensen | |
| 3,066,554 A * | 12/1962 | Hanson | 83/583 |
| 3,215,017 A | 11/1965 | Rutz | |
| 3,396,620 A * | 8/1968 | Raphael et al. | 83/686 |
| 3,398,621 A * | 8/1968 | Sack | 83/454 |
| 3,791,248 A | 2/1974 | Pearson | |
| 3,828,633 A | 8/1974 | Klingen | |
| 3,842,699 A * | 10/1974 | Zyl | 83/157 |
| 3,924,504 A * | 12/1975 | Kurtz | 83/568 |
| 4,002,092 A * | 1/1977 | Smith et al. | 83/55 |
| 4,250,784 A | 2/1981 | Bredow | |
| 4,305,268 A | 12/1981 | Hahn | |
| 4,417,510 A | 11/1983 | Sharp | |
| 4,485,714 A | 12/1984 | Eriksson | |
| 4,569,263 A | 2/1986 | Kravets | |
| 4,660,401 A * | 4/1987 | Kohama et al. | 72/331 |
| 4,787,542 A | 11/1988 | Ruff et al. | |
| 4,942,798 A | 7/1990 | Taub et al. | |
| 5,010,795 A | 4/1991 | Kania | |
| 5,103,702 A | 4/1992 | Yannazzone | |
| 5,195,413 A | 3/1993 | Johnson | |
| 5,237,901 A * | 8/1993 | Warga, III | 83/583 |
| 5,247,862 A * | 9/1993 | Haack | 83/27 |
| 5,327,806 A | 7/1994 | Houser | |
| 5,357,831 A * | 10/1994 | Michalik | 83/347 |
| 5,365,815 A * | 11/1994 | Pfaff, Jr. | 83/154 |
| 5,390,576 A | 2/1995 | Ishibashi | |
| 5,458,717 A * | 10/1995 | Kurita | 156/253 |
| 5,702,556 A * | 12/1997 | Okuma et al. | 156/261 |
| 5,820,999 A | 10/1998 | Li et al. | |
| 5,839,343 A * | 11/1998 | Michalik et al. | 83/663 |
| 5,896,795 A | 4/1999 | Harhay et al. | |
| 5,957,024 A * | 9/1999 | Kuwabara | 83/685 |
| 6,308,601 B1 * | 10/2001 | Seyna et al. | 83/56 |

* cited by examiner

*Primary Examiner*—Boyer D. Ashley
*Assistant Examiner*—Omar Flores-Sánchez
(74) *Attorney, Agent, or Firm*—Greenberg Traurig LLP; Peter J. Borghetti

(57) ABSTRACT

A method and apparatus are provided for reducing or eliminating sliver formation during aluminum sheet trimming operations. A resilient support pad is used in the trimming apparatus to substantially eliminate the formation of slivers which damage the surface finish of the part. Use of the resilient support pad also significantly reduces burr heights and improves trimmed edge quality. The method and apparatus are particularly useful for trimming aluminum autobody sheet.

16 Claims, 9 Drawing Sheets

METHOD AND APPARATUS FOR TRIMMING
ALUMINUM SHEET TO REDUCE SLIVERS
AND IMPROVE EDGE QUALITY

FIELD OF THE INVENTION

The present invention relates to trimming or shearing of aluminum sheet, and more particularly relates to a method and apparatus for reducing sliver production during trimming of sheet such as aluminum autobody sheet.

BACKGROUND INFORMATION

Automotive manufacturers are seeking ways of replacing steel components with aluminum components in order to gain benefits such as reduced weight and improved corrosion resistance. For example, attempts have been made to replace conventional steel autobody sheet with aluminum autobody sheet.

Trimming is an important operation in the autobody sheet forming process. Such trimming operations have conventionally been used to form steel sheet having adequate edge characteristics. When trimmed with dies conventionally designed for steel sheet, aluminum autobody sheet produces unacceptable cut surfaces having slivers, burrs, surface roughness and the like. Slivers are particularly disadvantageous because they cause damage to both the tooling and surface finish of the part. In addition, slivers contaminate the production line.

Aluminum autobody sheet produces appreciable amounts of slivers during trimming operations when trimmed with dies designed for steel sheets. The slivers can be carried to downstream operations and cause damage to the surface of formed parts, resulting in increased repair rates and line downtime. Hand removal of slivers from finished aluminum sheet products is usually employed in production practice. The sliver problem is identified as one of the major factors affecting the OEMs' manufacturing cost gap between using aluminum and steel autobody sheets. As much as a 5 to 10 percent cost reduction for outer panel manufacturing can be achieved if the sliver problem can be resolved.

Another critical concern is trimmed edge burrs which can affect assembly processes and tolerances, scratch other parts in handling, and impose safety hazards in manufacturing and in service of the products. Burrs are also a source of sliver generation in down-stream processes such as hemming U.S. Pat. No. 5,820,999 to Li et al., which is incorporated herein by reference, discloses an aluminum trimming method which utilizes angled cut conditions. A range of cutting angles is selected such that a wide range of clearances and cutting angles can result in satisfactory cutting operations. The method opens doors for next generation tool design which will not only minimize the current sliver problem and reduce burrs but will also substantially improve the process robustness of trimming aluminum sheets. However, the angled cutting method does not readily apply to existing conventional trimming dies which are configured for zero-degree cutting.

The present invention has been developed in view of the foregoing and to remedy other deficiencies of the prior art.

SUMMARY OF THE INVENTION

An aspect of the present invention is to control the slivering of aluminum sheet during trimming processes.

Another aspect of the present invention is to provide a method of trimming aluminum sheet. The method includes the steps of securing an aluminum sheet on a trim die adjacent a cutting blade, providing a resilient support pad around at least a portion of a periphery of the trim die in a trimming path of the cutting blade, and moving the cutting blade along the trimming path to force the aluminum sheet against the resilient support pad and to trim the aluminum sheet.

A further aspect of the present invention is to provide an apparatus for reducing sliver production during trimming of aluminum sheet comprising a trim die, a cutting blade movable along a trimming path to a position adjacent a periphery of the trim die, and a resilient support pad positioned in the trimming path of the cutting blade around at least a portion of the periphery of the trim die.

Another aspect of the present invention is to provide a trimmed aluminum sheet substantially free of slivers produced by securing an aluminum sheet on a trim die adjacent a cutting blade, providing a resilient support pad around at least a portion of a periphery of the trim die in a trimming path of the cutting blade, and moving the cutting blade along the trimming path to force the aluminum sheet against the resilient support pad and to trim the aluminum sheet.

These and other aspects of the present invention will become more apparent from the following description.

BRIEF DESCRIPTION OF THE DRAWINGS

FIG. 7 is a plot of burr height versus clearance percentage for aluminum sheet trimmed with and without a resilient support pad for a cutting blade edge radius of 0.0001-0.0004 in.

FIG. 8 is a plot of burr height versus clearance percentage for aluminum sheet trimmed with and without a resilient support pad for a cutting blade edge radius of 0.0001 in.

FIG. 9 is a plot of burr height versus clearance percentage for aluminum sheet trimmed with and without a resilient support pad for a cutting blade edge radius of 0.005 in.

FIG. 10 is a plot of burr height versus clearance percentage for aluminum sheet trimmed with and without a resilient support pad for a cutting blade edge radius of 0.010 in.

FIG. 11 is a plot of burr height versus clearance percentage for aluminum sheet trimmed with and without a resilient support pad for a cutting blade edge radius of 0.020 in.

DETAILED DESCRIPTION

Figure 1:
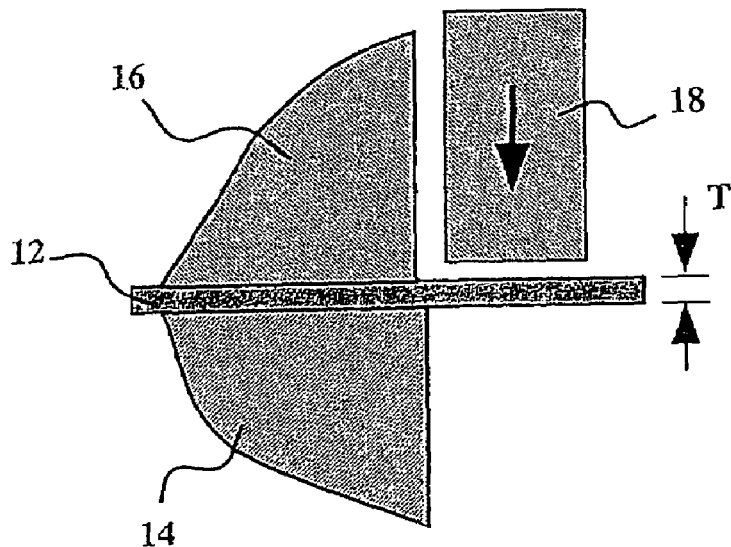
FIG. 1 is a partially schematic side view of a conventional apparatus for trimming steel autobody sheet.

The present invention provides advantages in comparison with conventional trimming tools. FIG. 1 schematically illustrates a conventional apparatus 10 for cutting sheet metal such as steel autobody sheet. A metal sheet 12 having a thickness T is sandwiched between a die 14 and a pad 16. A cutting blade 18 travels in a vertical direction adjacent the die 14 and pad 16 to trim the sheet 12.

Figure 2:
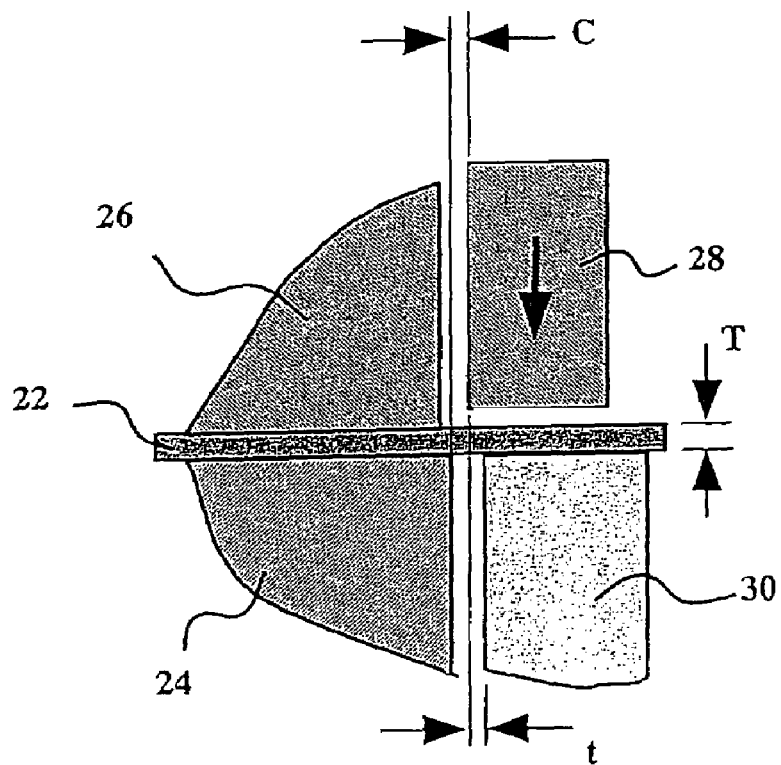
FIG. 2 is a partially schematic side view of an apparatus for trimming aluminum sheet in accordance with an embodiment of the present invention.

In contrast with conventional trimming tools, the present invention utilizes a resilient support pad as part of an aluminum sheet trimming operation which substantially reduces or eliminates sliver and burr formation. FIG. 2 is a partially schematic side view of an apparatus 20 for trimming aluminum sheet in accordance with an embodiment of the present invention. An aluminum sheet 22 having a thickness T is sandwiched between a trim die 24 and a holding pad 26. A cutting blade 28 travels in a vertical direction adjacent the trim die 24 and holding pad 26 to trim the aluminum sheet 22. The thickness T of the aluminum sheet 22 is typically from about 0.5 to about 1.5 mm, usually from about 0.7 to about 1.1 mm. Various aluminum alloy compositions may be trimmed, such as Aluminum Association 6111-T4, 6022-T4, 6009-T4, 6010-T4, 2008-T4, 5182-0 alloys and the like.

In accordance with the present invention, a resilient support pad 30 is provided adjacent the trim die 24 outside the metal sheet trim line which is defined by the cutting edge of the blade, e.g., the left side of the cutting blade 28 in FIG. 2. The resilient support pad 30 is horizontally offset from the trim line by an offset distance t. In order to provide sufficient local support near the cutting area and still not interfere with the cutting action, the offset distance t preferably ranges from about 25 to about 200 percent of the aluminum sheet thickness T, more preferably from about 50 to about 100 percent. In a particularly preferred embodiment, the resilient support pad 30 may be located at approximately one half of the sheet thickness away from the trim line. The trim die 24 and cutting blade 28 are separated from each other by a horizontal clearance distance C. The ratio of the clearance C to the aluminum sheet thickness T preferably ranges from about 2 to about 40 percent, more preferably from about 2.5 to about 30 percent.

It is preferred that the height of the resilient support pad 30 be at or near the same level as the trim die 24, as shown in FIG. 2. Aluminum autobody sheet usually fractures completely when the blade penetrates about 20 to 30 percent of sheet thickness. Therefore, the present method may become less effective if the support pad 30 is lower than the trim die 24 level by more than about 50 percent of the sheet thickness T.

The width of the resilient pad 30, in the horizontal direction shown in FIG. 2, is preferably from about 5 to about 300 mm, more preferably from about 15 to about 150 mm. The resilient support pad 30 preferably has a thickness, in the vertical direction shown in FIG. 2, of from about 3 to about 500 mm, more preferably from about 20 to about 200 mm.

The hardness of the support pad material should be selected according to the thickness or depth of the pad. Thicker pads typically require harder material. Within such thickness ranges, the resilient support pad 30 preferably has a resilience, defined by the modulus of the material, of from about 30 to about 10,000 psi, more preferably from about 100 to about 4,000 psi. Polymeric material such as a polyurethane material designated PT22-60A may be used as the resilient support pad. The PT22-60A material may have the following mechanical properties: tensile strength=2,700 psi; 100% modulus=240 psi; 300% modulus=350 psi; and ultimate elongation=600%.

Figure 3:
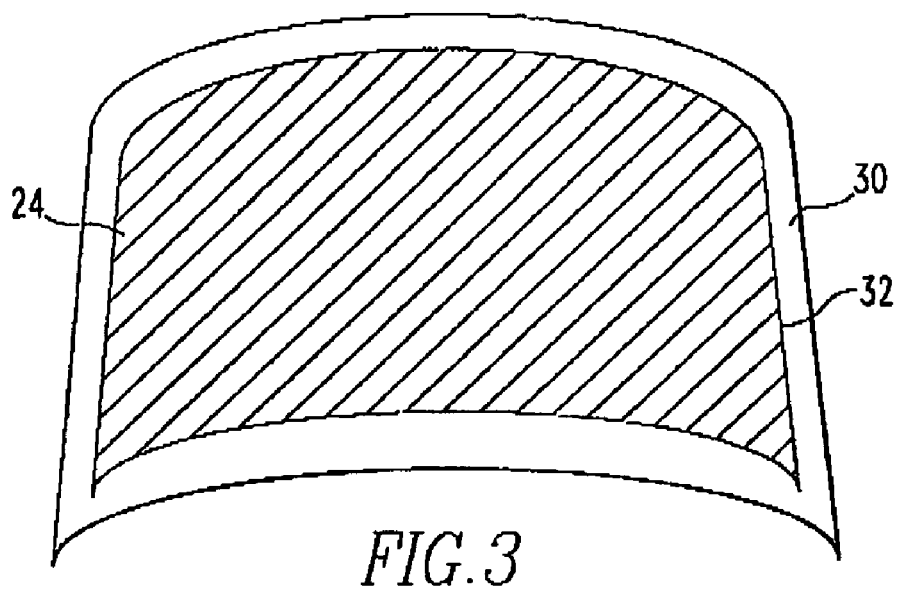
FIG. 3 is a partially schematic top view of an apparatus for trimming aluminum sheet in accordance with an embodiment of the present invention.

As illustrated in FIGS. 2 and 3, production trimming tools for automotive panels in accordance with the present invention can be implemented by positioning the resilient support pad 30 adjacent the trim die 24 outside of the trim line 32. During the trimming operation, the holding pad 26 and the trim die 24 clamp the aluminum sheet 22, then the cutting blade 28 contacts, penetrates and cuts off the sheet 22. The resilient support pad 30 provides increasing back pressure to the aluminum sheet 22 until it is completely separated.

Figure 4:
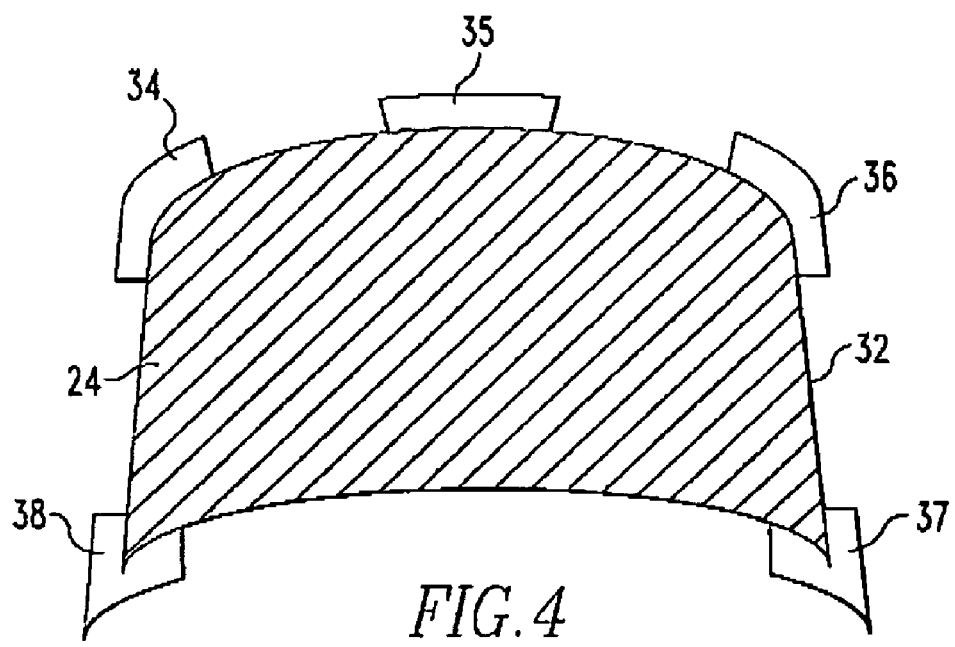
FIG. 4 is a partially schematic top view of an apparatus for trimming aluminum sheet in accordance with another embodiment of the present invention.

FIG. 4 illustrates an alternative embodiment of the present invention in which the resilient support pad does not extend the entire distance around the periphery of the trim die 24. Instead, multiple support pads 34, 35, 36, 37 and 38 are only provided in critical sliver/burr areas.

Figure 5B:
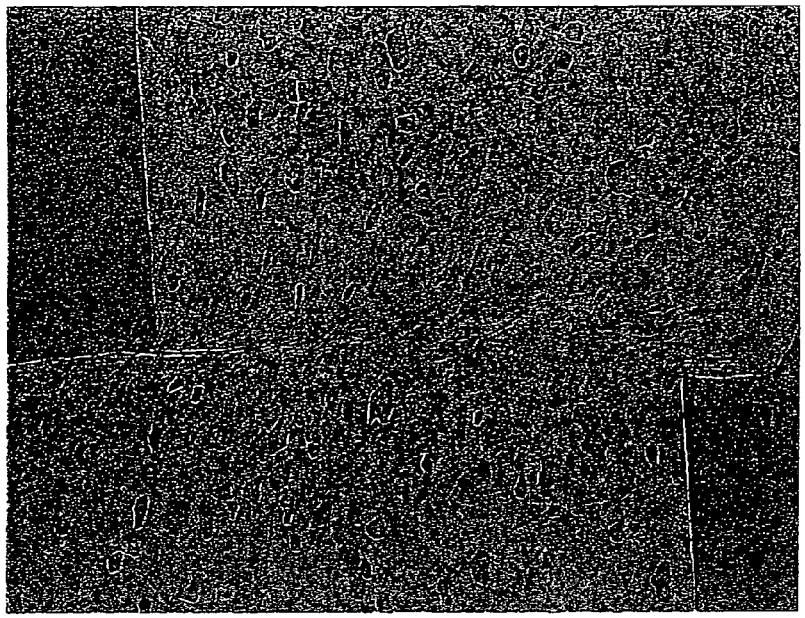
FIG. 5b is a photomicrograph of a partially trimmed aluminum sheet, illustrating a curved localization zone which results when a resilient support pad is not used.
Figure 5A:
FIG. 5a is a photomicrograph of a partially trimmed aluminum sheet, illustrating a substantially straight localization zone achieved through the use of a resilient support pad in accordance with the present invention.

FIGS. 5a, 5b, 6a and 6b are photographs of 6111-T4 aluminum autobody sheets having thicknesses of 1 mm which were trimmed with a clearance C of 5 percent and a blade sharpness of 0.001 inch edge radius. The sheets illustrated in FIGS. 5a and 6a were trimmed using a resilient pad of PT22-60A polyurethane material having a thickness of 2 inches (51 mm) and a width of 1.5 inches (38 mm). The sheets shown in FIGS. 5b and 6b were trimmed without the resilient pad. During the ductile fracture process which occurs in the trimming process, fracture follows the path of localization. The localization zone is straight when a supporting pad is used, as shown in FIG. 5a, while it is curved without a supporting pad as shown in FIG. 5b.

Figure 6B:
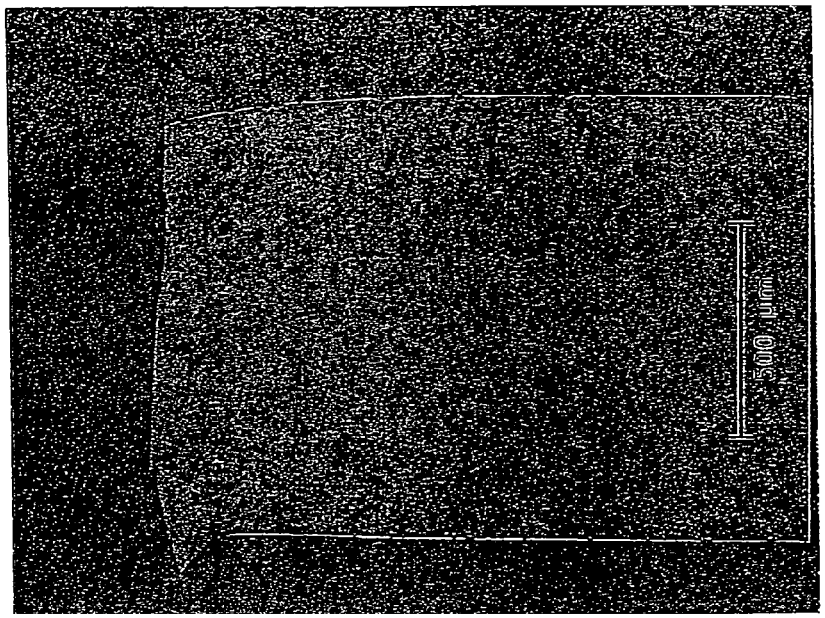
FIG. 6b is a photomicrograph of a trimmed aluminum sheet having a large burr height which results when a resilient support pad is not used.
Figure 6A:
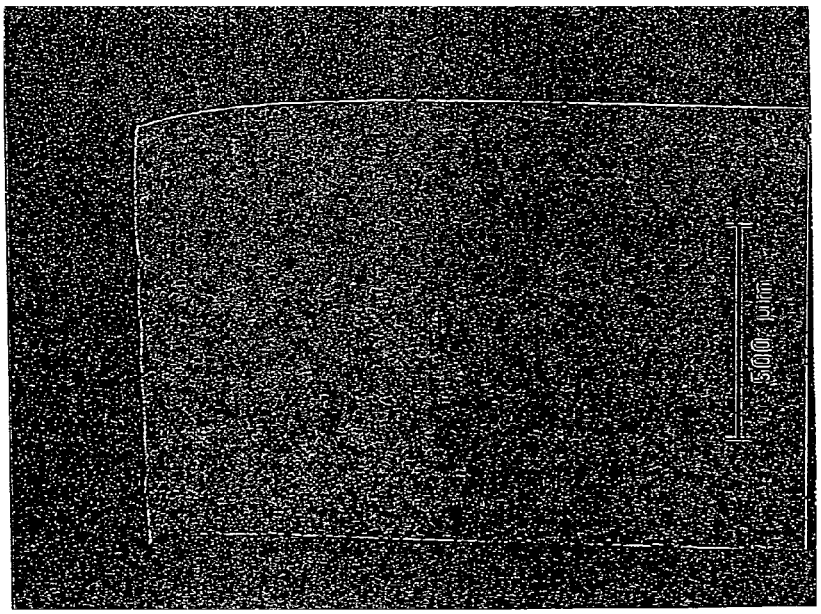
FIG. 6a is a photomicrograph of a trimmed aluminum sheet with minimum burr height achieved through the use of a resilient support pad in accordance with the present invention.
Figure 7:
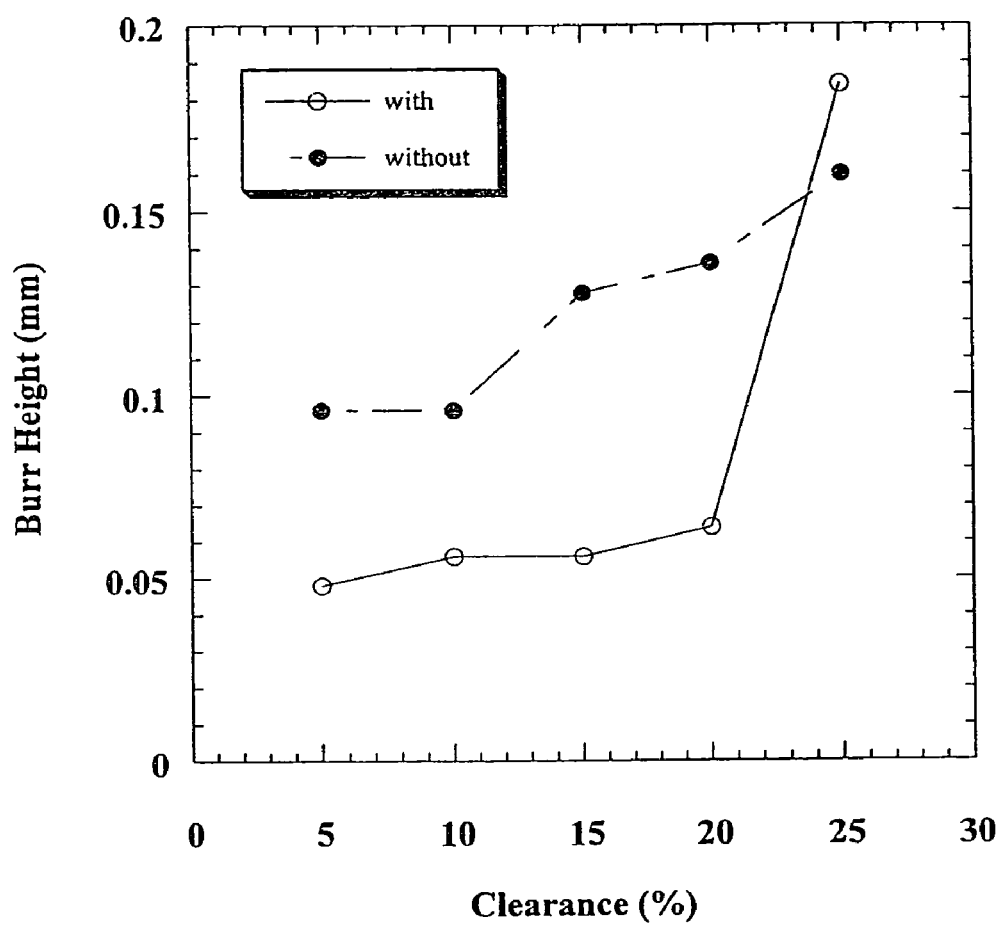
Figure 8:
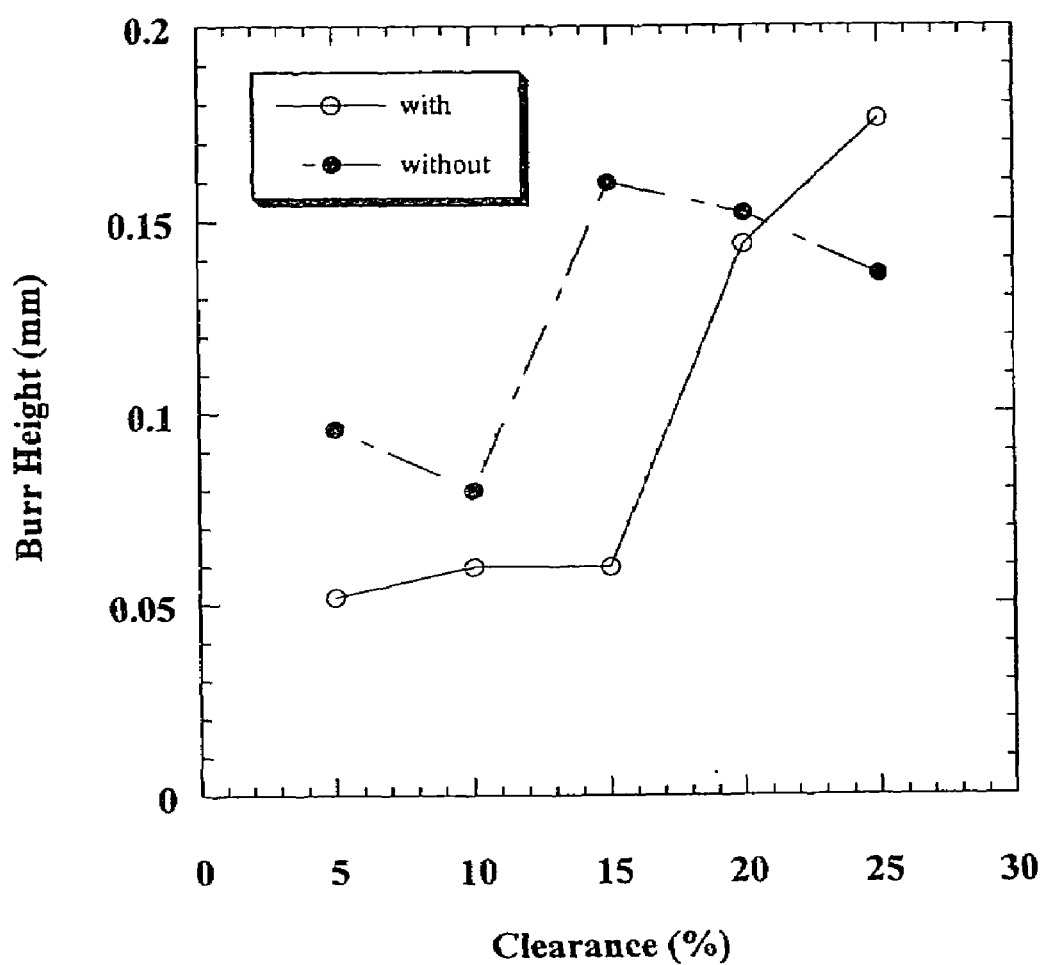
Figure 9:
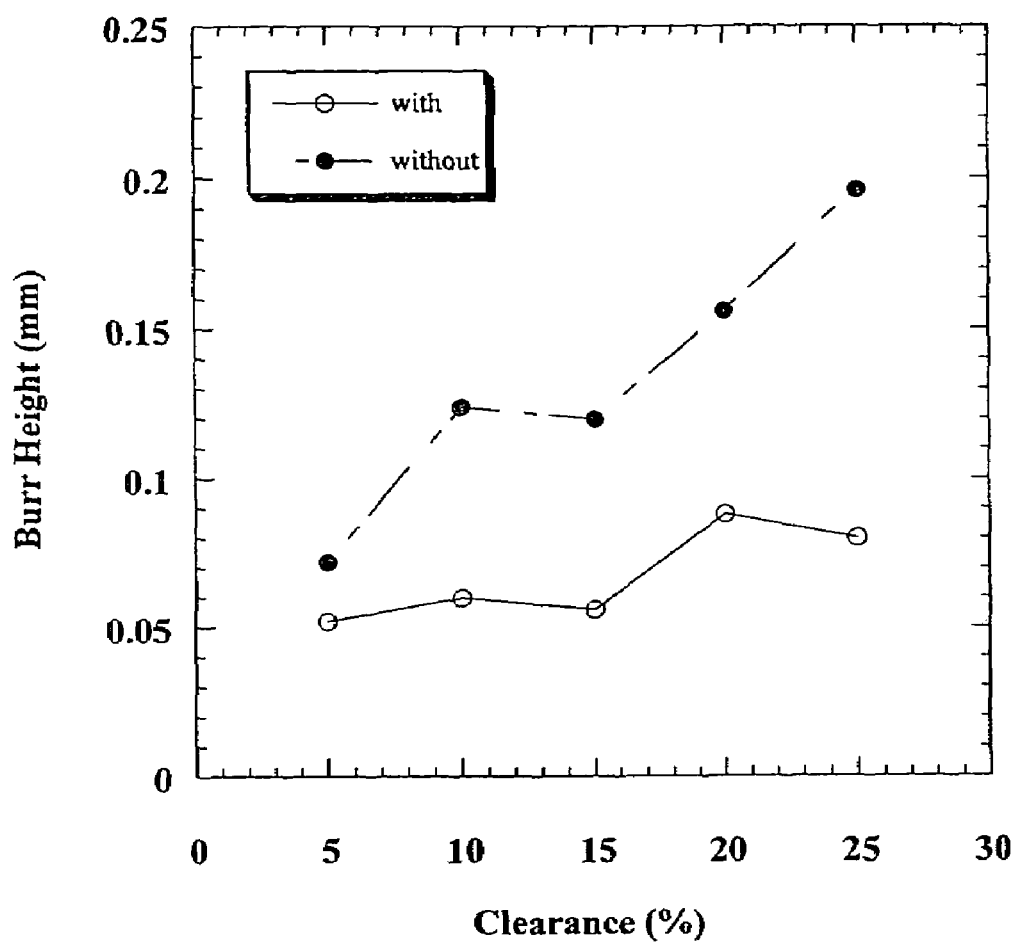
Figure 10:
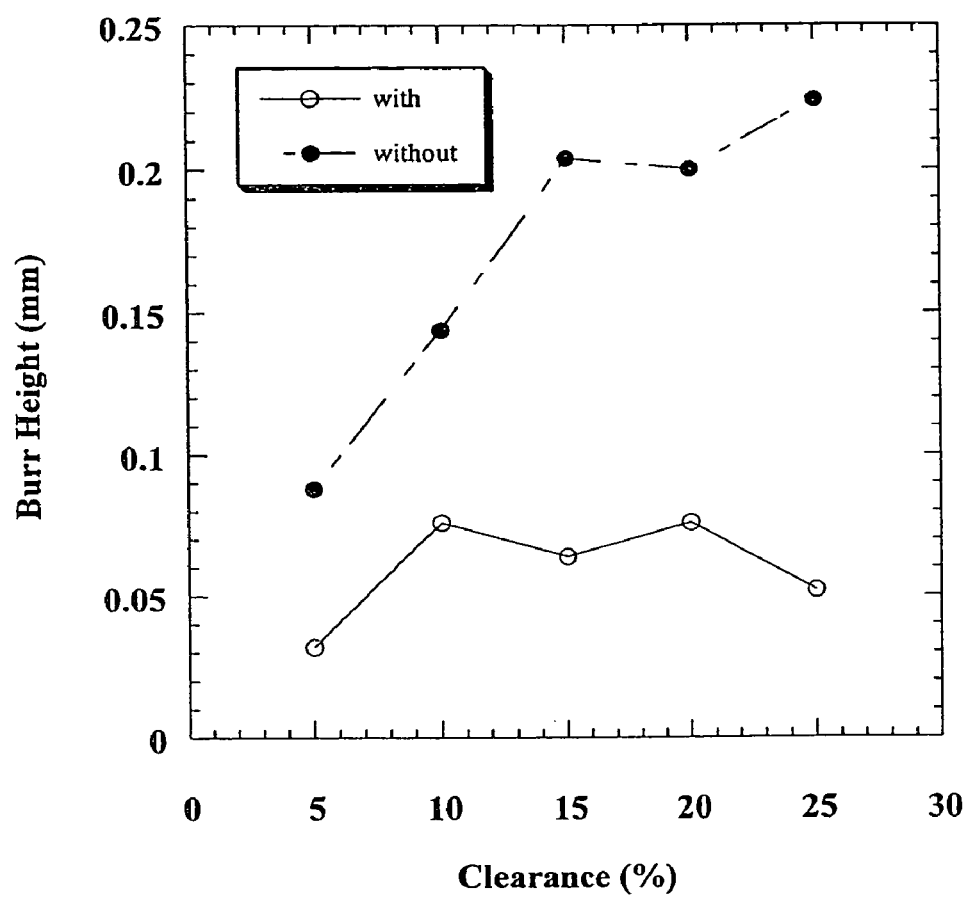
Figure 11:
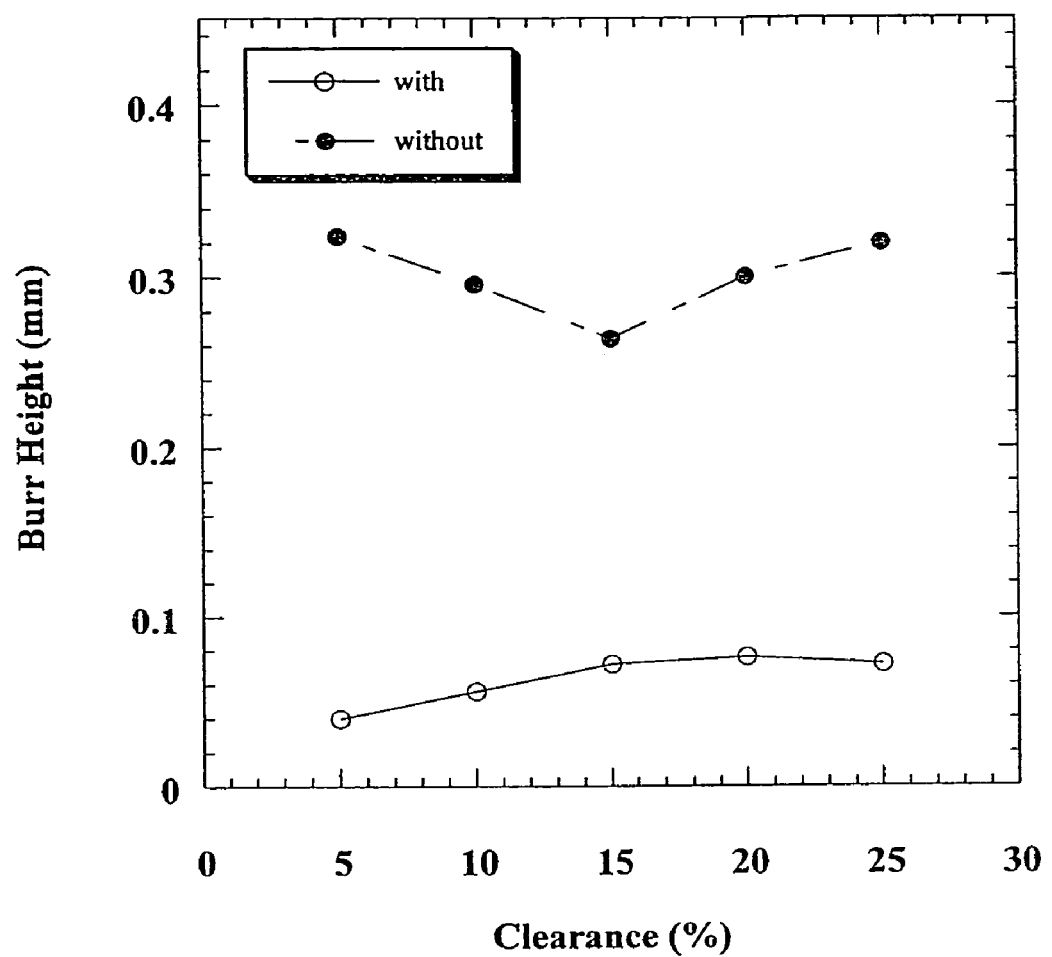

In accordance with the present invention, the use of a resilient support pad substantially eliminates bending stresses during the cutting process. Consequently, the cut edge is straight when a supporting pad is used, as shown in FIG. 6a, and curved without a supporting pad as shown in FIG. 6b. As a result, burrs are significantly reduced when cutting with the resilient support pad of the present invention. Because the majority of slivers are generated from the top surface of the scrap due to bending effects and friction, the use of a resilient support pad reduces or eliminates the major source of slivers.

Tests were performed at various cutting conditions. A total of 25 cutting conditions were tested. Five replicate tests were performed for each cutting condition. Table 1 documents the results for sliver generation with and without a supporting pad made of PT22-60A polymeric material. The present method and apparatus completely eliminate sliver generation for all test conditions.

Table 2 documents the burr measurements for all test conditions with and without the supporting pad. Burrs were measured by using standard metallographic techniques. Two burr locations on each sample were measured to determine an average value.

TABLE 1

Sliver Generation Results

| | % Clearance | | | | |
|---|---|---|---|---|---|
| Blade edge radius (in) | 5 | 10 | 15 | 20 | 25 |
| | Without Supporting Pad | | | | |
| Sharp | Significant amount of hair-like slivers | Some hair-like slivers | Almost no slivers | No slivers | No slivers |
| 0.001 | Significant amount of hair-like slivers | Many hair-like slivers | Some slivers | No slivers | No slivers |
| 0.005 | A few hair-like slivers; some large piece slivers and particles | Almost no hair-like slivers, some large piece slivers and particles | Almost no hair-like slivers, a few large piece slivers and particles | No slivers | No slivers |
| 0.010 | Almost no hair-like slivers, many large piece slivers and particles | No hair-like slivers, some large piece slivers and particles | No hair-like slivers, a few large piece slivers | No slivers | No slivers |
| 0.020 | No hair-like slivers, many large piece slivers and particles | No hair-like slivers, many large piece slivers and particles | No hair-like slivers, some large piece slivers and particles | No slivers and particles | No slivers and particles |
| | With Supporting Pad | | | | |
| Sharp | No slivers | No slivers | No slivers | No slivers | No slivers |
| 0.001 | No slivers | No slivers | No slivers | No slivers | No slivers |
| 0.005 | No slivers | No slivers | No slivers | No slivers | No slivers |
| 0.010 | No slivers | No slivers | No slivers | No slivers | No slivers |
| 0.020 | No slivers | No slivers | No slivers | No slivers | No slivers |

TABLE 2

Burr Height Results

| Blade edge radius (in.) | % Clearance | | | | |
|---|---|---|---|---|---|
| | 5 | 10 | 15 | 20 | 25 |
| | Without Supporting Pad | | | | |
| Sharp | 0.096 mm | 0.096 mm | 0.128 mm | 0.136 mm | 0.160 mm |
| 0.001 | 0.096 mm | 0.080 mm | 0.160 mm | 0.152 mm | 0.136 mm |
| 0.005 | 0.072 mm | 0.124 mm | 0.120 mm | 0.156 mm | 0.196 mm |
| 0.010 | 0.088 mm | 0.144 mm | 0.204 mm | 0.200 mm | 0.224 mm |
| 0.020 | 0.324 mm | 0.296 mm | 0.264 mm | 0.300 mm | 0.320 mm |
| | With Supporting Pad | | | | |
| Sharp | 0.048 mm | 0.056 mm | 0.056 mm | 0.064 mm | 0.184 mm |
| 0.001 | 0.052 mm | 0.060 mm | 0.060 mm | 0.144 mm | 0.176 mm |
| 0.005 | 0.052 mm | 0.060 mm | 0.056 mm | 0.088 mm | 0.080 mm |
| 0.010 | 0.032 mm | 0.076 mm | 0.064 mm | 0.076 mm | 0.052 mm |
| 0.020 | 0.040 mm | 0.056 mm | 0.072 mm | 0.076 mm | 0.072 mm |

FIGS. 7 to 11 graphically illustrate the burr height measurement data for aluminum sheet trimmed with and without a resilient support pad. The burr heights are typically from 200 to 400 percent smaller for the aluminum sheet trimmed in accordance with the present invention utilizing a resilient support pad. Because this method more effectively controls the cutting interface, the method is particularly useful in extending the operating life of trimming tools as they become dull due to normal blade wear.

The present invention can significantly reduce sliver generation in automated trimming operations of aluminum autobody sheets. Resolving the sliver problem can appreciably reduce the manufacturing cost of aluminum autobody panels. In addition, the present method substantially reduces cut edge burrs compared with conventional trimming tool designs. Furthermore, the present method is very simple to implement in existing OEM production trimming operations Whereas particular embodiments of the present invention have been described herein, it is to be understood that various changes, additions, adaptations and modifications may be made without departing from the scope of the invention, as set forth in the appended claims.

What is claimed is:

1. An apparatus for reducing sliver production during trimming about a perimeter of an aluminum autobody sheet comprising:
   a trim die having an upper surface and an outer perimeter, wherein a portion of the outer perimeter is non-linear;
   a cutting blade being adapted for movement along a trim line defined by a cutting edge of the cutting blade, wherein the cutting edge of the cutting blade is an inner edge of the cutting blade juxtaposition the outer perimeter of the trim die, wherein a clearance distance is provided between the cutting edge of the cutting blade and the outer perimeter of the trim die;
   a holding pad having a bottom surface adjacent to the upper surface of the trim die such that the aluminum autobody sheet is capable of being positioned between the trim die and the holding pad and is capable of being outwardly extended therefrom;
   a plurality of resilient support pads, wherein each pad of the plurality of resilient support pads being adjacently positioned along the outer perimeter of the trim die outside the trim line forming a gap between each adjacent resilient support pad and the trim die and forming a space between each adjacent resilient support pad sufficient to support the aluminum autobody sheet on an upper surface of each adjacent resilient support pad when the cutting blade trims the aluminum autobody sheet along the trim line adjacent the space such that localized bending stresses acting on the aluminum autobody sheet arc substantially eliminated,
   wherein each adjacent resilient support pad is fixed at an offset distance from the cutting edge of the cutting blade, wherein the offset distance ranges from 25 percent to 200 percent of a thickness of the aluminum autobody sheet, whereby, ductile fracture of the aluminum autobody sheet follows a substantially straight path along the trim line to result in a substantial reduction in sliver or burr formation.

2. The apparatus of claim 1, wherein the offset distance is from about 50 to 100 percent of a thickness of the aluminum sheet.

3. The apparatus of claim 1, wherein the upper surface of each adjacent resilient support pad is at substantially the same level as the upper surface of the trim die when the apparatus is at rest.

4. The apparatus of claim 3, wherein the level of the upper surface of each adjacent resilient support pad and the level of the upper surface of the trim die are separated from each other a distance of less than about 50 percent of a thickness of the aluminum autobody sheet.

5. The apparatus of claim 1, wherein each adjacent resilient support pad has a width in a horizontal direction of from about 5 to about 300 mm, and a thickness in a vertical direction of from about 3 to about 500 mm.

6. The apparatus of claim 1, wherein each adjacent resilient support pad has a width in a horizontal direction of from about 15 to about 150 mm, and a thickness in a vertical direction of from about 20 to about 200 mm.

7. The apparatus of claim 1, wherein each adjacent resilient support pad has a modulus of from about 30 to about 10,000 psi.

8. The apparatus of claim 1, wherein each adjacent resilient support pad has a modulus or from about 100 to 4,000 psi.

9. The apparatus of claim 1, wherein each adjacent resilient support pad comprises polyurethane.

10. The apparatus of claim 1, wherein the clearance distance is from about 2 to about 40 percent of a thickness of the aluminum sheet.

11. The apparatus of claim 10, wherein the clearance distance is from about 2.5 to about 30 percent of the thickness of the aluminum sheet.

12. The apparatus of claim 1, wherein the aluminum sheet has a thickness of from about 0.5 to about 1.5 mm.

13. The apparatus of claim 1, wherein the aluminum sheet has a thickness of from about 0.7 to about 1.1 mm.

14. The apparatus of claim 1, wherein the plurality of resilient support pads arc only positioned adjacent critical areas of sliver or burr formation.

15. The apparatus of claim 14, wherein the critical areas arc corners of the trim die.

16. The apparatus of claim 1, wherein the gap is formed by the clearance distance and the offset distance.

* * * * *

UNITED STATES PATENT AND TRADEMARK OFFICE
CERTIFICATE OF CORRECTION

| | | |
|---|---|---|
| PATENT NO. | : 7,430,951 B1 | Page 1 of 1 |
| APPLICATION NO. | : 09/645653 | |
| DATED | : October 7, 2008 | |
| INVENTOR(S) | : Ming Li et al. | |

It is certified that error appears in the above-identified patent and that said Letters Patent is hereby corrected as shown below:

On the title page, Section (56) References Cited, following U.S. PATENT DOCUMENTS listed, insert

FOREIGN PATENT DOCUMENTS

SU 745608 04/1978
EP PCT/EP90/00521 11/1990

In column 6, line 65, line 29 of Claim 1, after "sheet", delete "arc" and insert --are--.

In column 8, line 19, line 2 of Claim 14, after "pads", delete "arc" and insert --are--.

In column 8, line 21, line 1 of Claim 15, after "areas", delete "arc" and insert --are--.

Signed and Sealed this

Twenty-fifth Day of November, 2008

JON W. DUDAS
*Director of the United States Patent and Trademark Office*